United States Patent
Eroshin et al.

(10) Patent No.: US 11,055,353 B2
(45) Date of Patent: Jul. 6, 2021

(54) TYPEAHEAD AND AUTOCOMPLETE FOR NATURAL LANGUAGE QUERIES

(71) Applicant: salesforce.com, inc., San Franciso, CA (US)

(72) Inventors: Vlad Eroshin, San Francisco, CA (US); Dylan Thom, San Francisco, CA (US); Ryoji Osawa, San Francisco, CA (US); Dai Duong Doan, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 254 days.

(21) Appl. No.: 15/885,430

(22) Filed: Jan. 31, 2018

(65) Prior Publication Data

US 2019/0236217 A1 Aug. 1, 2019

(51) Int. Cl.
*G06F 16/90* (2019.01)
*G06F 16/9032* (2019.01)
*G06F 16/242* (2019.01)
*G06F 40/186* (2020.01)
*G06F 40/205* (2020.01)
*G06F 40/279* (2020.01)

(52) U.S. Cl.
CPC ...... *G06F 16/90328* (2019.01); *G06F 16/243* (2019.01); *G06F 40/186* (2020.01); *G06F 40/205* (2020.01); *G06F 40/279* (2020.01)

(58) Field of Classification Search
CPC . G06F 16/90328; G06F 16/243; G06F 17/248
See application file for complete search history.

(56) References Cited

U.S. PATENT DOCUMENTS

| | | | |
|---|---|---|---|
| 9,384,244 B1* | 7/2016 | Garg | G06F 16/24578 |
| 10,320,633 B1* | 6/2019 | Wong | H04L 67/22 |
| 2016/0373456 A1* | 12/2016 | Vermeulen | G06F 16/245 |
| 2017/0024424 A1* | 1/2017 | Almohizea | G06F 16/248 |
| 2017/0060868 A1 | 3/2017 | Rais Ghasem et al. | |
| 2017/0235448 A1 | 8/2017 | Kammath et al. | |
| 2018/0075095 A1* | 3/2018 | Srivastava | G06F 16/90324 |

* cited by examiner

*Primary Examiner* — Loc Tran
(74) *Attorney, Agent, or Firm* — Sterne, Kessler, Goldstein & Fox P.L.L.C.

(57) ABSTRACT

Embodiments are described for enabling a user to query a database using natural language and receive results without requiring the user to manipulate or know details of the database contents. The user is guided in the creation of the natural language query by suggested predetermined queries from a template. Natural language is parsed using the template. The approach allows a user's query words to be completed automatically from the template as the user inputs the words. The approach further allows the next suggested parts of the query to be automatically typed from the template ahead of the user's cursor. Other features provide feedback to the user for invalid or irrelevant queries that cannot be parsed, including suggesting complete predetermined queries from the template. The approach helps the user focus the query on exactly what the user seeks to learn from the database without complex, process-intensive parsing.

21 Claims, 5 Drawing Sheets

TYPEAHEAD AND AUTOCOMPLETE FOR NATURAL LANGUAGE QUERIES

CROSS-REFERENCE TO RELATED APPLICATIONS

This application is related to U.S. patent application Ser. No. 15/885,351, filed Jan. 31, 2018, entitled "Actionable Answer Card in Natural Language Query", the entirety of which is hereby incorporated by reference.

BACKGROUND

Typical database management systems (DBMS) consist of an integrated set of computer software that allows users to interact with one or more databases and to access the data contained in the database(s). A DBMS allows entry, storage, and retrieval of large quantities of information and, coupled with data analytics software, provides a user means to manage how that information is organized and presented. Various presentation formats, such as dashboards, can help a business user visualize changing business conditions in the form of visual reports to make decisions based on real-time data. Dashboards help users identify trends, regroup data by varying parameters, sort out quantities, and measure the impact of their activities. To build a dashboard, a user of a typical DBMS has to know the data and its parameters (dimensions and measures, for example) in order to properly query the data and get the best, most applicable results.

Querying complex data from a database to focus results on a specific answer can be difficult and time consuming if queries are not already set up and stored for the data, often by a database administrator with the ability to write complex queries. Learning curves for working with specific data can also be quite long until a user feels comfortable navigating the data. In addition, various databases may use a wide range of query languages that each require significant training, user effort, or processing power to parse query inputs and produce useful results.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Natural Language Query (NLQ) allows a user to ask questions about data in a database, and get answers efficiently and easily from a database, without needing to know specific measures, dimensions, filters, and similar data parameters before querying the data. The initial querying and subsequent use of the data can be approached conversationally, that is, in the language that a user would normally use to talk to another human being.

Conversations and stories are how people naturally communicate and interface with each other. Framing experiences as conversation will result in greater productivity and higher engagement. It will also reduce the learning curve and other challenges of using a new tool for the business user by making the method of querying data as simple and natural as a conversation. NLQ enables business users to ask a question about a dataset in the context of a visual view of the data, such as a dashboard or app, without knowing the details about the data structure that went into building the view. Multiple users can converse about the data without being experts, or even knowledgeable, about the specific database contents as long as the users know the general business context of the database.

In addition to allowing a user freedom to ask questions of the database in natural language, further efficiencies can be made by predicting what the user might want to know, presenting options to the user based on a past or current query, pre-entering the query into a query box as the user types it, suggesting the next word, or autocorrecting any error that the user is suspected to have made while entering the query.

Disclosed herein are methods, systems, and computer program products that enable a user to ask questions about data in a database using natural language and receive quick answers in a "conversational" graphical user interface (GUI) without needing to manipulate, or even to know the details of, measures, dimensions, filters, etc. of the data in advance. By way of non-limiting examples, the answers can be displayed in a dashboard, opened in an explorer view, shared with collaborators, or further queried or manipulated using natural language in other applications that are configured to use natural language query (NLQ) within the data analytics system. The natural language is parsed using templates, in one embodiment, and features are available to provide feedback to the user for invalid or unrelated queries that cannot be parsed for any number of reasons, as exemplified herein. As in a conversation between two parties, the methods, systems, and computer products allow, as a key feature, the user to have a back-and-forth conversation with the database to further focus the user's query results on exactly what the user seeks to know, while greatly simplifying the querying process for the user.

Figure 1:
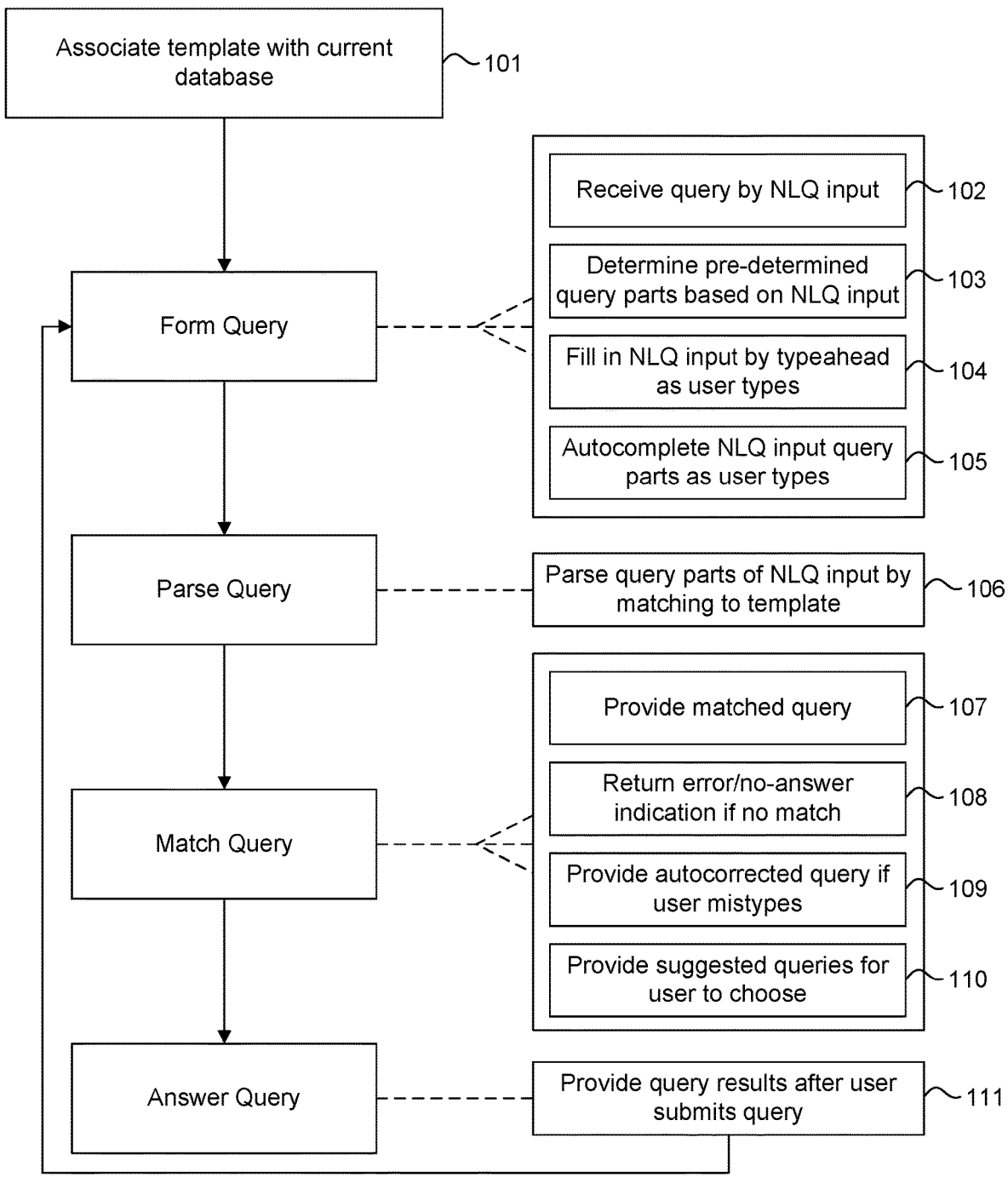
FIG. 1 shows a flow chart depicting the process steps of the method of typeahead and autocomplete for natural language queries.

FIG. 1 illustrates a flow chart of a method 100, showing an embodiment of a combination of process steps to (101) associate a pre-determined template with the currently loaded database for parsing the NLQ input, (102) receive an NLQ input to query a database in an analytics environment, (103) from the NLQ input, determine the query parts, (104) fill in the NLQ input for the user by typing ahead of the user as the user types, (105) autocomplete query parts of the NLQ input for the user, as the user types, if the input matches a template part, (106) parse query parts, such as a measure (for example, "sales"), a dimension (for example, "by region"), and additional query parts, by matching the NLQ input to the template contents, and (107) determine a predetermined query based on the parsed query parts matched to the template. If query parts do not match the pre-determined template, the process may (108) return an error/no-answer indication to the user, (109) provide an autocorrected query if the user mistypes and the template is able to predict the intended match, or (110) provide suggested queries for the user to choose from that are relevant to the current database.

When a query is complete and the user is satisfied with the NLQ input, the method will (111) allow query results to be provided to the user after the user submits the query.

"NLQ," or "natural language query," as used herein, refers to interrogating a database about specific content, where the query consists only of standard terms in the user's natural language, without any special syntax or format. A query can be built using terms in any form, including a statement (or full sentence), a question, or a list of keywords. A processing engine processes the terms in the query input text. While typical natural language query approaches include complex analysis and phrase recognition using heavy parsers with probability models, embodiments disclosed herein describe a simplified approach that depends on categorizing and mapping grammar, and working with a smaller subset of data for higher performance efficiency and better accuracy. For example, in this method, an off-the-shelf parser does not have to be trained.

"Template," as referred to herein, is a software representation of a lookup tree for determining analytics queries. In the exemplary embodiment, a template consists of a list of predefined natural language queries in English form that would closely match a human user's predicted questions about data in a database. Each natural language query is mapped to a predefined Analytics Query Language (AQL) query. Once a user's question is matched to a natural language query in the template, the corresponding AQL query will be able to load input data, operate on it, and output the results data. Such a template allows an NLQ application to more efficiently parse a user's query because, regardless of the exact words or ordering of words that the user inputs, a template can help ensure that the query is of proper format and content in relation to the database being queried. A query is simply made up of statements, where each statement has an input, an operation, and an output. It is to be appreciated that the novel method described herein may use templates written in other query languages, such as standard SQL (structured query language) and Datalog.

The "NLQ input," as referred to herein, can be, for example, a GUI box with a cursor for free-form typing of text, a drop-down menu from which a text item can be selected with a click of a mouse, or other user-selectable input. The exemplary embodiment is described herein as a free-form text box for typing from a cursor, with alternative selectable text to fill in the free-form text box. When the cursor is inside the NLQ input box, the method will accept a user's typing of "Enter" on a keyboard or other similar computing device input, for example, at any time to submit the text as a query. Once the query is matched to the template and after the user submits it, the method will answer the query by providing relevant query results, if available from the current database. The method 100 is not limited to this example embodiment.

It is to be appreciated that not all steps depicted in method 100 may be needed to perform the disclosure provided herein. Further, some of the steps may be performed simultaneously, or in a different order than shown in FIG. 1, as will be understood by a person of ordinary skill in the relevant art. Regardless of the performance or the order of performance of certain steps, the disclosure describes key features that are generally available to the user and applicable to many possible embodiments within a GUI.

Natural Language Query (NLQ) architecture allows NLQ to be used in various models of a data analytics application, such as, for example, Explorer, App Runtime, and Builder applications of a customer relationship management (OM) analytics platform, using common natural language processing (NLP) in a novel way. A person of ordinary skill in the art will appreciate that this method can be used on other data analytics platforms and in a wide variety of other applications that query databases.

Figure 2:
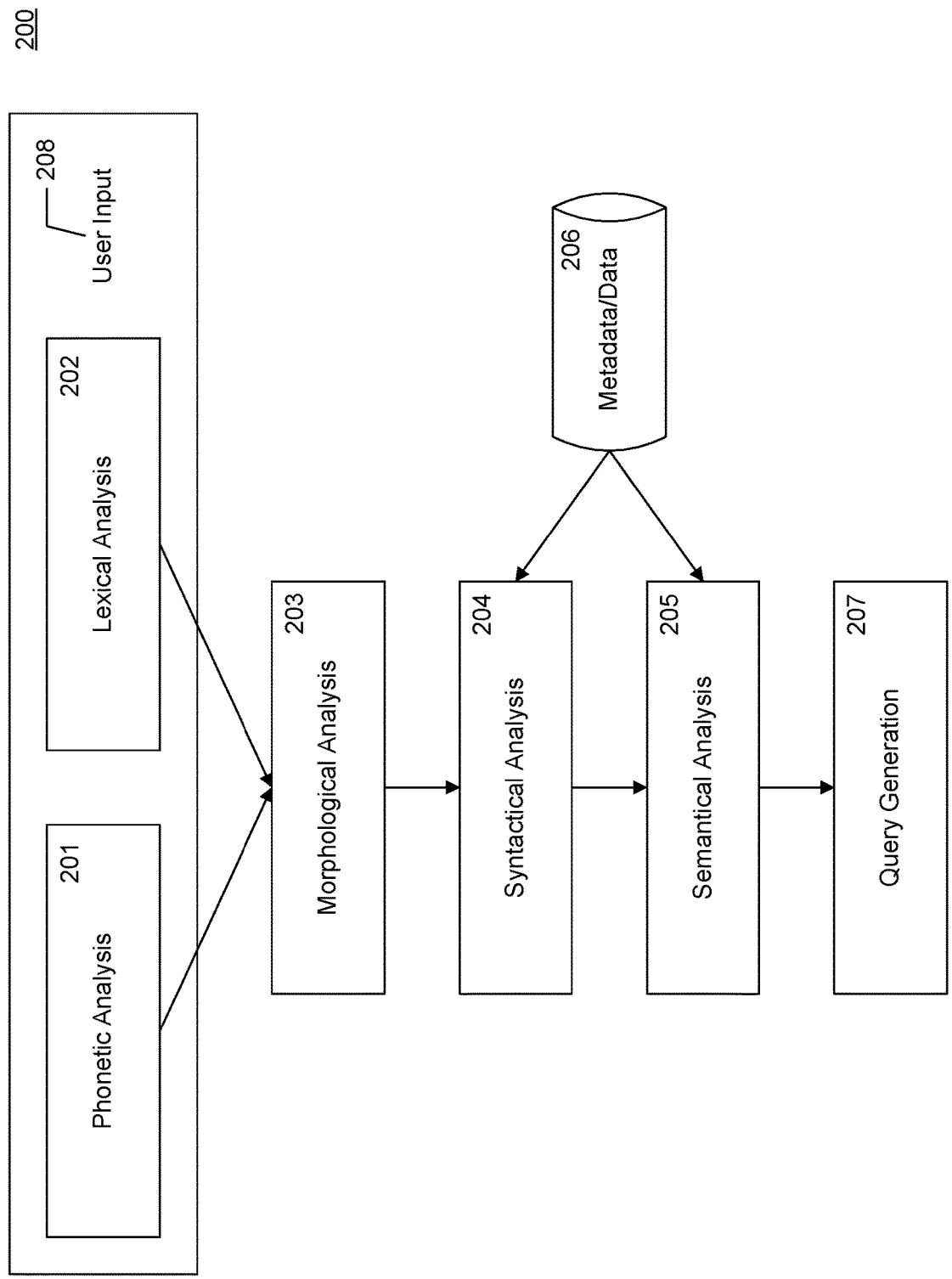
FIG. 2 shows the components of a natural language processing system.

The foundation of NLQ analysis is the same across all applications that use natural language and is built upon the analysis structure 200 depicted in FIG. 2. Embodiments disclosed herein perform the types of natural language analysis of user input 208 as known in the art, such as phonetic 201, lexical 202, morphological 203, syntactical 204, and semantical 205 analysis, but it limits its syntactical and semantical analysis to the metadata/data 206 known in the database, in order to greatly simplify query generation 207 for the user. In accordance with some embodiments disclosed herein, the NLQ domain is limited to the natural language queries that users would ask regarding the data at hand, so there is no need to support, for example, full English language grammar as is known to be supported in the art. Using a simple GUI input, a user can ask a simple conversational question about data and receive an answer responsive to the user's needs and focused only on what the user asked. A person of ordinary skill in the art would understand that this method could also be applied to other natural languages, such as French, German, or Spanish, for example.

To simplify query generation, embodiments disclosed herein are built upon a novel use of templates to provide efficient parsing of an NLQ input from the user, using a lexicon based upon the metadata in the database and grammar as predicted from a typical user of the known data. The purpose of the NLQ input in a GUI is to accept a user's free-form text typing of natural language, where the user provides the scope of the query by the keywords entered, and then to match a user's intended query to a pre-determined template. The pre-determined template allows the GUI to guide the user with hints and suggestions for words to include in the query that would yield the most applicable and useful query results, bounded by the supported template and relevant to the loaded database. The template provides only the grammar needed and uses a lexicon that is smaller than typically used by natural language parsers, reducing the complexity necessary to complete the parsing function.

Any complexity in the template "lookup," or input matching, function is further hidden from the user. When the user types an input, one or more predefined natural language queries may be suggested to the user and easily run, despite any complexities in the underlying data. For instance, although a query may require complex software code to manipulate data for specific query results, that complexity will be hidden in one template sentence or phrase. Similarly, although a query may require a complex lookup to parse a complex user input, the user will not sense that complexity. The templates themselves are not difficult to retrieve or use: they can be packaged with an application for use with specific databases, or they can be called up as standalone items from anywhere, for example, a local server or Cloud storage, with a new database load. Because the templates work in the background, their access is seamless to the user. However, templates can be easily updated if a user so chooses to change their content.

Figure 3:
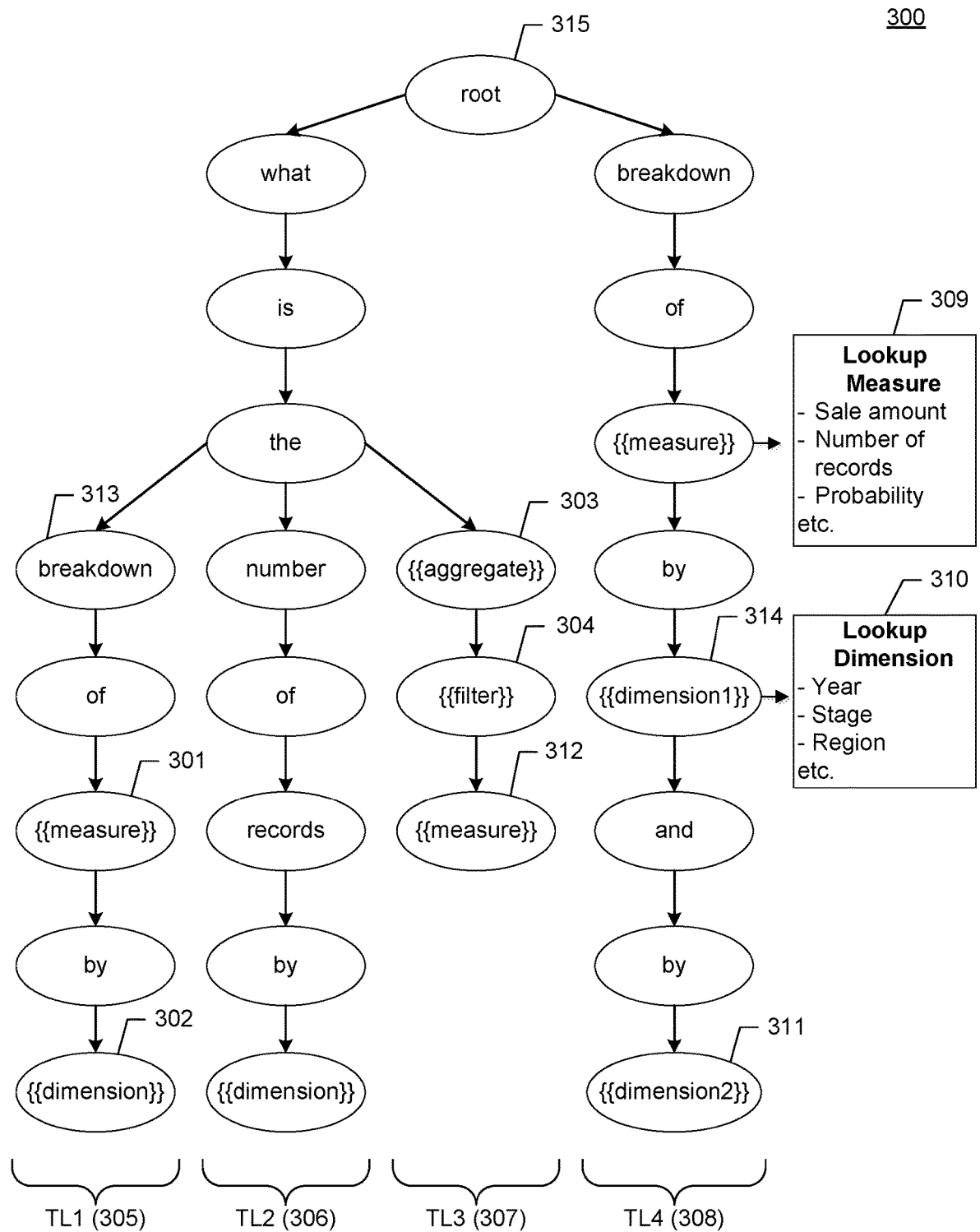
FIG. 3 illustrates an example of the behavior of the typeahead and autocomplete functions of NLQ as a user types an NLQ input.

FIG. 3 shows how template content is accessed and matched in the form of a lookup tree 300. When a user starts typing a query into the NLQ input, the NLQ input parsing function, starting from a root 315, looks for metadata placeholder node types within the NLQ input, such as measure, dimension, dataset, aggregate, filter, scope, or sort. The lookup node type "measure" 309 is a placeholder for metadata that includes things that can be measured, such as sales or sales amount, records or number of records, probability, opportunity or opportunities, leads, products or number of products, revenue, or time to close, for example. The lookup node type "dimension" 310 is a placeholder for metadata that includes the time, space, or place over which the measures are measured, such as year, month, quarter, opportunity stage, lead source, industry, state, country, region, or segment, for example. The node type "dataset" is a placeholder for metadata that is a specific reference to a group of data within a database, if the database is organized by such dataset groupings, such as by account. The node type "aggregate" refers to such metadata grouping terms as min, max, sum, total, or average, for example. The node type "filter" is used when a user wants to learn something specific about the data when inherent metadata groupings exist, such as "open accounts" versus "closed accounts," for example, "What is the total number of open accounts?" The node type "scope" is a narrowing of groups of data by their scope, for example, by ownership, as in "my accounts," The node type "sort" refers to querying the database for results that are ordered in a specific way, for example, "What are my accounts by most to least sales?" A person of ordinary skill in the art will appreciate that a wide range of other metadata placeholder node types may be included in a template lookup tree. It will be appreciated that variations are as endless as the data types contained in databases.

As illustrated in FIG. 3, the template matches the words in the NLQ input by progressing through the lookup tree of pre-determined language according to the database being queried. The lookup tree, generally, will have lookup paths that are formatted to an expected question such as, "What is the {{measure}} by {{dimension}}?" For example, if the user asks, "What is the number of records by year?," the template will look up the measure as "number of records" and the dimension as "year." In the template embodiment shown in FIG. 3, "number of records" is hardcoded into the tree (see path TL2, 306), but the tree could just as well have a placeholder {{measure}} in another template embodiment. A path of only placeholders for the lookup, which is, for instance, effective if it is difficult to predict what a user might ask about the data, is shown in path TL3 307. For example, if a user types "min closed sales" in the NLQ input, the lookup tree, traveling down path TL3 307, would parse that input as {{aggregate}} 303 {{filter}} 304 {{measure}} 312 and provide the results for the minimum number of closed sales.

Note that the user does not have to form the query as a question to get results that are responsive to the query. For example, the words "what is the" can be built into the lookup tree to handle the introductory words in an NLQ input, as shown in TL2 306, but if they are not included in the NLQ input, the software can assume them and still reach other paths such as TL1 305 and TL3 307. In another embodiment, the software may also accept "show me," "list," "find," "tell me," or similar variations, as introductory phrases, for example. Nor does the user have to order the words in precisely the same way for each query, as the template can predict variations in word order. For sure, the placeholder node {{measure}} 301 in TL1 305 refers to the same generic node as {{measure}} 312 in TL3 307. The user can also word a query in variable ways to get the same results returned, and a template can predict those variations, such as "breakdown 313 of {{measure}} 301 by {{dimension}} 302," as illustrated in TL1 305. Breakdown 313 would be a predictably standard word that users would input when querying a database in natural language.

A user may also ask questions of higher complexity about the data, for instance, including two dimensions 311 and 314 by which to query the database, as exemplified in TL4 308. For example, TL4 308 would build the query, "Breakdown of sales amount by month and by state," so that a user could find out that there were $1,472,922 in sales in February, 2016 in Arizona, for example, when the query generates an answer. A person of ordinary skill in the art would appreciate the sheer number of variations in how data from even a single database could be represented using this method.

Embodiments disclosed herein perform two exemplary features of query generation using template lookups: "typeahead" and "autocomplete." These features aid the user in constructing a query quickly, as the method guides the user in not only what to build but how to build it in effective predetermined ways, and constructing the query easily, as the method supports a powerful user interface that is simple and straightforward. A person of ordinary skill in the art would appreciate the challenges in sparing a user the architectural complexities inherent in querying a large database while providing the user a powerful interface that is surprisingly very simple to use with a basic GUI that is easily integrated onto a variety of platforms and is transportable across applications.

"Typeahead" refers to first matching what the user types in the NLQ input to words in a predetermined template, predicting the user's next typed words in the NLQ input based on the matches, and displaying suggestions of those words as phrases below the NLQ input ahead of what the user physically types. "Typeahead" thus helps the user to complete the user's query. The user is intended to see these suggestions as the possible, and the most applicable, next words to type in the query input. The user may ignore the text and type different word(s), or the user may begin to type the suggested word(s) from a sample query. As the user types and the query becomes more specific, the suggested phrase adapts accordingly to the prediction of the user's query. The suggested sample queries come from the associated template that is loaded with the database. If the user begins to type a suggested word as displayed in the typeahead text, the "autocomplete" feature will complete the word and the next possible typeahead word(s) will be shown below the NLQ input, thus further decreasing the effort that the user must expend.

Figure 4:
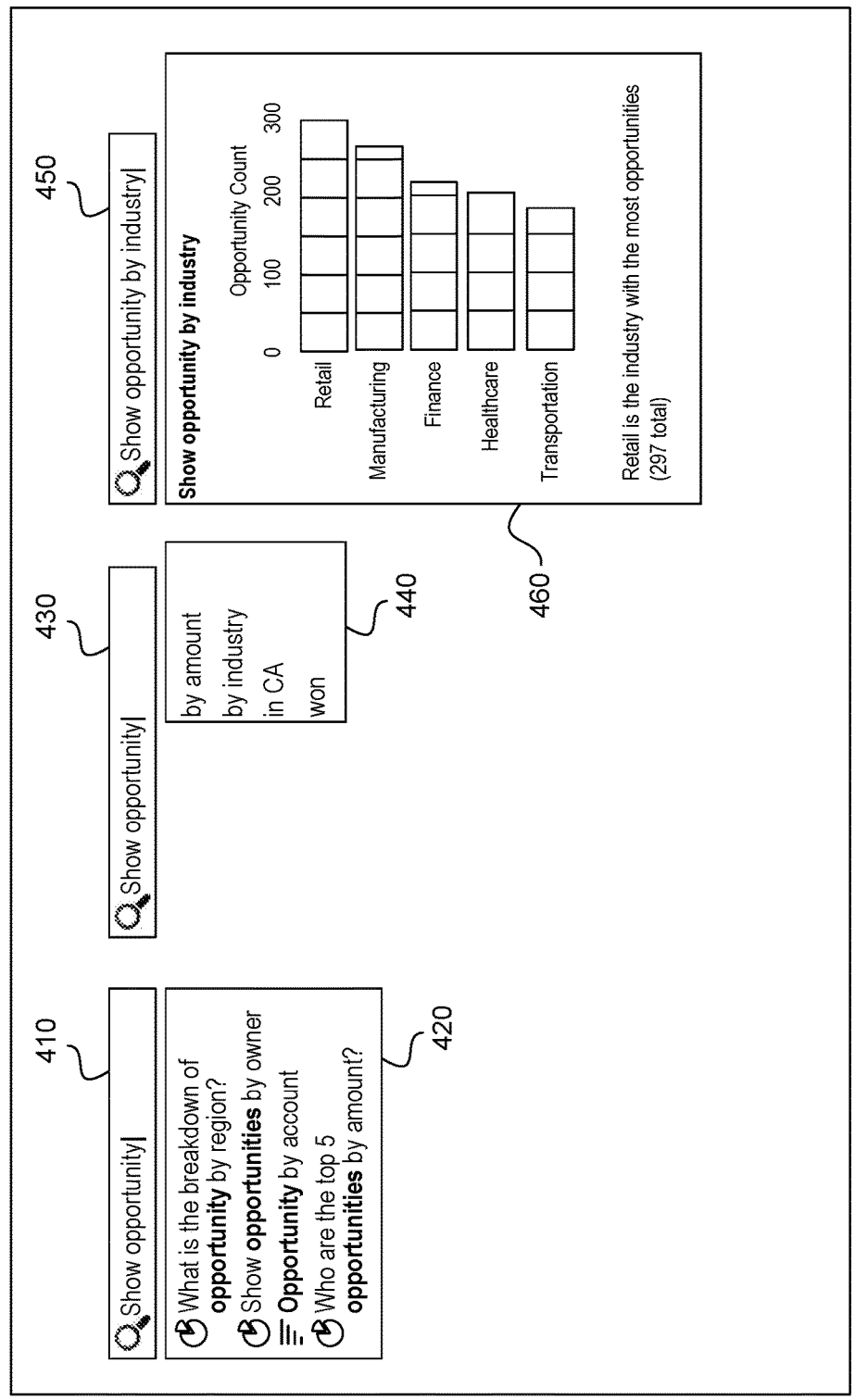
FIG. 4 illustrates how the data structure in a template is accessed as a lookup tree in a natural language query.

FIG. 4 shows an example GUI interaction 400 for typeahead and autocomplete. As shown in FIG. 4, when a user types the measure "opportunity" in the NLQ input box 410, the template lookup will focus on all template paths suggested, i.e., all questions that a user might ask, regarding opportunity, and display them in a box below the NLQ input 420. A user may also simply click on a suggested query from the box 420 and hit "Enter" to submit the query, which will cause the query results to be displayed for that query. If the user types a space after "opportunity," as shown in the NLQ input box 430, the suggestions under the NLQ input box 440 will change to match the template for possibilities in the "Show {{measure}} by {{dimension}}" format, in this case, "Show opportunity" by/in {{dimension}}," or, alternatively, in "Show {{measure}} {{filter}}" format, for example, "Show opportunity won" (versus lost). Any other possible query format would show up in the suggestions box 440 if they have been pre-determined in the template. In the exemplary embodiment, the next typeahead suggestions float from left to right to start under the current location of the user's cursor, as shown in the suggestions box 440, which allows the user a more direct view of the next suggestions as the user types. If the user types a different word in the NLQ input that does not match the typeahead suggestion, the typeahead suggestions will change to most closely match the user's predicted next input, based on the template. When the user has finished typing a query, as exemplified in the NLQ input box 450, or has selected a suggestion from the suggestions box 420 or 440, the user may hit "Enter" on the user's keyboard or other input device to submit the query and cause the software to return query results 460 for that query.

FIG. 4 illustrates details of example query results in the form of an answer card 460 for the NLQ input "Show opportunity by industry" 450. A person of ordinary skill in the art will appreciate that the output of this method in the form of query results could be displayed in any number of ways to the user, or be used by any number of applications executing this method to collaborate with others, inform the user's continued exploration of the data, or use findings to build a story (such as with an analytics dashboard). In fact, after one set of query results has been returned to the user, the method disclosed herein can be performed again, initiated by the user typing into the NLQ input box again, and causing a new set of query suggestions to be displayed to the user for further focusing of the data results. This method thus allows for the actionable display and use of results as disclosed in related U.S. patent application Ser. No. 15/885, 351, "Actionable Answer Card in Natural Language Query." The template approach allows such query functionality to be more user-friendly and assistive than has ever been provided in the known art, especially for drilling down into complex databases to help a user build the most appropriate query for the user's needs, quickly and painlessly.

Because the NLQ input is an open text input field, the user can type in whatever text is desired, even if the query would not result in an answer. The user has control to submit a query at any time from the NLQ input, but relevant results will only be returned once enough of the query has been matched to a query in the template for a loaded database or dataset. "Enough" of the query to facilitate a lookup in the template would be, for example, entry of a measure and a filter criterion into the NLQ input. Because relevant filter criteria may change based on the specific data measure being queried, and a user may not have enough knowledge of the appropriate filter to type, the method will provide suggestions as previously discussed. Even with the additional guidance, certain situations will not result in query results, but will instead provide an error state that may be displayed to the user in various ways depending on the platform or application. The method provides this free-form NLQ input with error-checking capability and an overall state-checking capability, for example, so that a user can know why query results are not provided as requested. Example error states are invalid query, empty state, no dataset, or autocorrected query. These error states allow a user to be informed of and to fix a query quickly.

In one embodiment, if the user types a word or phrase into the NLQ input that is not in the template, that is, is not relevant to the database, such as "Hello world," the method identifies the query as invalid. The method will thus return an error message below the NLQ input space, for example, indicating to the user "Could not find an answer to your question. Please try with a different query." The method will alternatively provide a suggested query from the template that is relevant to the current database, such as "Ask questions such as 'What are my top 5 opportunities?'" Thus, a user will be guided toward a relevant query, saving time and confusion. The user can then replace the query with the suggestion or a similarly relevant query without spending time to remedially learn about the database contents outside of the application space. Once a new relevant query is submitted, the error message will go away.

A similar query suggestion from the template is displayed, for example, when the user first accesses the NLQ input functionality in an application, that is, for an initial, or empty, state of the NLQ input. The NLQ input will be disabled if there is no dataset or database, and thus no template, loaded in the current application, and the exemplary embodiment of the method will indicate such to the user. Lastly, the method allows a user to submit a query with a misspelled word, and the method will attempt to match the misspelled word, returning results for the closest match in the template and indicating to the user that the substitution of the autocorrected word was performed to provide the query results. For example, if the user enters "Show oportunties by segment," with "opportunities" spelled incorrectly, the template will be able to match the typed word to the dimension "opportunities" in the template, so that relevant results may be returned. The method will indicate to the user "Showing results for opportunities" instead of "oportunties."

In another embodiment, the method allows a user to define the user's own scope filters. For example, the user may want to know something specific about the data for which a metadata lookup term is not included in a standard template for the specific database. The method allows a user to create and save unique scope filter entities that will be used with the template when that particular user logs in to an application and queries that database.

Computer System Implementation

Figure 5:
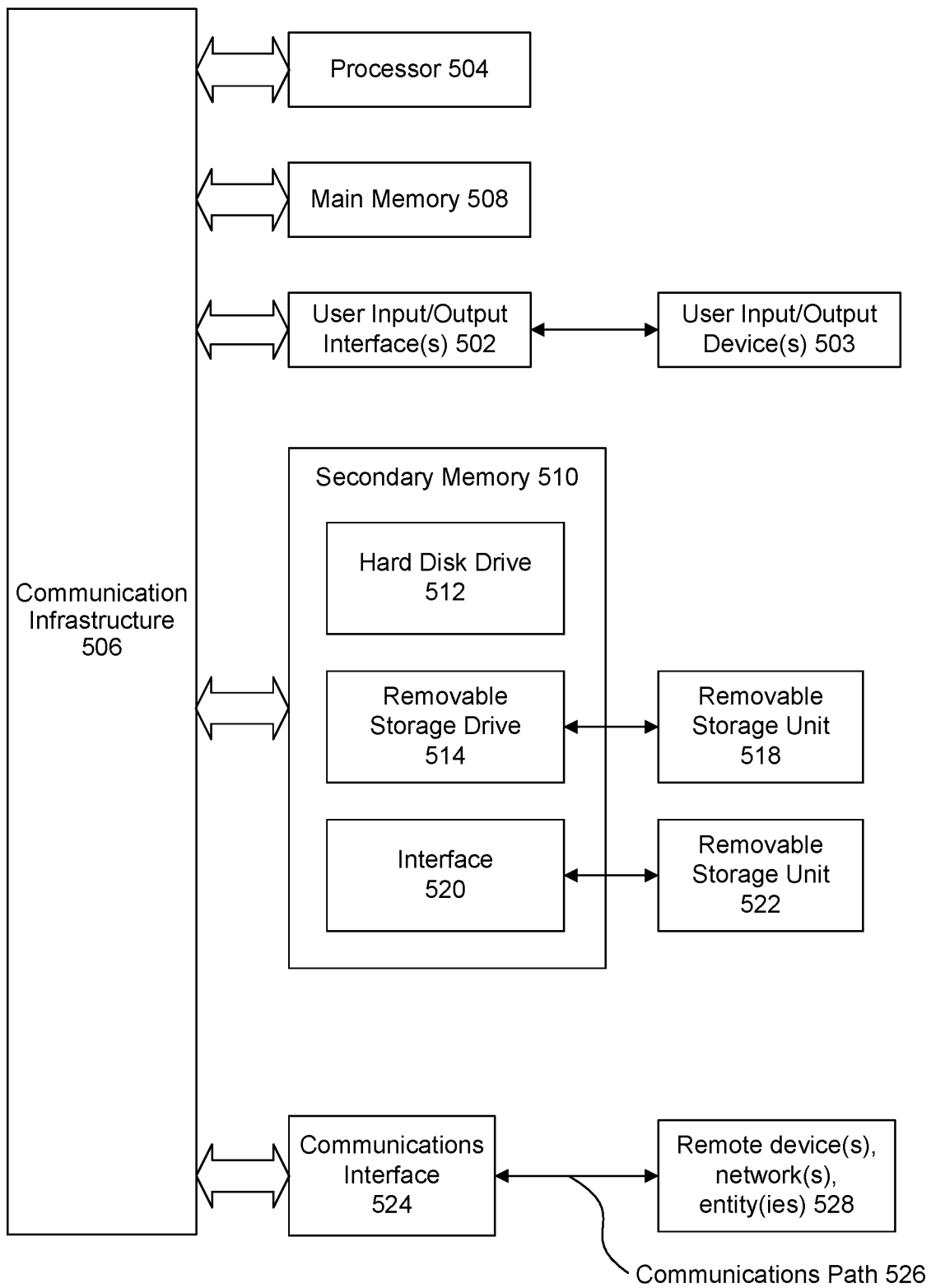
FIG. 5 shows an example computer system useful for implementing various embodiments.

Various embodiments may be implemented using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 or a removable storage device or drive 514. Removable storage drive 514 may be a floppy disk drive, a magnetic tape drive, a compact disk drive, an optical storage device, tape backup device, or any other storage device/drive.

Removable storage drive 514 may interact with a removable storage unit 518. Removable storage unit 518 may include a computer usable or readable storage device having stored thereon computer software (control logic) or data. Removable storage unit 518 may be a floppy disk, magnetic tape, compact disk, DVD, optical storage disk, or any other computer data storage device. Removable storage chive 514 may read from or write to removable storage unit 518.

Secondary memory 510 may include other means, devices, components, instrumentalities, or other approaches for allowing computer programs or other instructions or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired or wireless (or a combination thereof), and which may include any combination of LANs, WANs, the Internet, etc. Control logic or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 500 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
determining, by a computing device, a template associated with a database, wherein the template defines a set of predetermined natural language queries using a lookup tree, and the template maps each predetermined natural language query in the set of predetermined natural language queries to a respective Analytics Query Language (AQL) query;
after the determining, receiving, by the computing device, a natural language query (NLQ) input configured to query the database;
identifying, by the computing device, a query part in the NLQ input;
matching, by the computing device, the query part in the NLQ input to a metadata placeholder node in a path in the lookup tree of the template, wherein the path corresponds to a predetermined natural language query in the set of predetermined natural language queries;
sorting, by the computing device, an order of the metadata placeholder node in the path in the lookup tree of the template by a predetermined sorting part of the template;
filtering, by the computing device, the metadata placeholder node in the path in the lookup tree of the template by a predetermined filtering part of the template;
updating, by the computing device, the query part in the NLQ input to be metadata in the metadata placeholder node corresponding to the predetermined natural language query based on the matching; and
providing, by the computing device, a suggested next query part for the NLQ input from the predetermined natural language query based on the matching.

2. The method of claim 1, wherein the matching the query part in the NLQ input to the metadata placeholder node in the path in the lookup tree of the template comprises traversing the path in the lookup tree, wherein the path comprises a plurality of query parts in the predetermined natural language query.

3. The method of claim 1, wherein the matching the query part in the NLQ input to the metadata placeholder node in the path in the lookup tree of the template comprises identifying the query part in the NLQ input as a measure of the database, wherein the identifying is performed by traversing a list of measures in the template.

4. The method of claim 1, wherein the matching the query part in the NLQ input to the metadata placeholder node in the path in the lookup tree of the template comprises identifying the query part in the NLQ input as a dimension of the database, wherein the identifying is performed by traversing a list of dimensions in the template.

5. The method of claim 1, wherein the matching the query part in the NLQ input to the metadata placeholder node in the path in the lookup tree of the template comprises identifying the query part in the NLQ input as an aggregation of a measure of the database, wherein the identifying is performed by traversing a list of aggregations of measures in the template.

6. The method of claim 1, wherein the matching the query part in the NLQ input to the metadata placeholder node in the path in the lookup tree of the template comprises identifying the query part in the NLQ input as a grouping of a dimension of the database, wherein the identifying is performed by traversing a list of groupings of dimensions in the template.

7. A system, comprising:
a memory; and
at least one processor coupled to the memory, wherein the at least one processor is configured to:
determine a template associated with a database, wherein the template defines a set of predetermined natural language queries using a lookup tree, and the template maps each predetermined natural language query in the set of predetermined natural language queries to a respective Analytics Query Language (AQL) query;
after the determination of the template, receive a natural language query (NLQ) input configured to query the database;
identify a query part in the NLQ input;
match the query part in the NLQ input to a metadata placeholder node in a path in the lookup tree of the template, wherein the path corresponds to a predetermined natural language query in the set of predetermined natural language queries;
sort an order of the metadata placeholder node in the path in the lookup tree of the template by a predetermined sorting part of the template;
filter the metadata placeholder node in the path in the lookup tree of the template by a predetermined filtering part of the template;
update the query part in the NLQ input to be metadata in the metadata placeholder node corresponding to the predetermined natural language query based on the matching; and
provide a suggested next query part for the NLQ input from the predetermined natural language query based on the matching.

8. The system of claim 7, wherein to match the query part in the NLQ input to the metadata placeholder node in the path in the lookup tree of the template, the at least one processor is configured to traverse the path in the lookup tree, wherein the path comprises a plurality of query parts in the predetermined natural language query.

9. The system of claim 7, wherein to match the query part in the NLQ input to the metadata placeholder node in the path in the lookup tree of the template, the at least one processor is configured to identify the query part in the NLQ input as a measure of the database, wherein the identifying is performed by traversing a list of measures in the template.

10. The system of claim 7, wherein to match the query part in the NLQ input to the metadata placeholder node in the path in the lookup tree of the template, the at least one processor is configured to identify the query part in the NLQ input as a dimension of the database, wherein the identifying is performed by traversing a list of dimensions in the template.

11. The system of claim 7, wherein to match the query part in the NLQ input to the metadata placeholder node in the path in the lookup tree of the template, the at least one processor is configured to identify the query part in the NLQ input as an aggregation of a measure of the database, wherein the identifying is performed by traversing a list of aggregations of measures in the template.

12. The system of claim 7, wherein to match the query part in the NLQ input to the metadata placeholder node in the path in the lookup tree of the template, the at least one processor is configured to identify the query part in the NLQ input as a grouping of a dimension of the database, wherein the identifying is performed by traversing a list of groupings of dimensions in the template.

13. A non-transitory computer-readable medium having instructions stored thereon that, when executed by a computing device, cause the computing device to perform operations comprising:
   determining a template associated with a database, wherein the template defines a set of predetermined natural language queries using a lookup tree, and the template maps each predetermined natural language query in the set of predetermined natural language queries to a respective Analytics Query Language (AQL) query;
   after the determining, receiving a natural language query (NLQ) input configured to query a database;
   identifying a query part in the NLQ input;
   matching the query part in the NLQ input to a metadata placeholder node in a path in the lookup tree of the template, wherein the path corresponds to a predetermined natural language query in the set of predetermined natural language queries;
   sorting an order of the metadata placeholder node in the path in the lookup tree of the template by a predetermined sorting part of the template;
   filtering the metadata placeholder node in the path in the lookup tree of the template by a predetermined filtering part of the template;
   updating the query part in the NLQ input to be metadata in the metadata placeholder node corresponding to the predetermined natural language query based on the matching; and
   providing a suggested next query part for the NLQ input from the predetermined natural language query based on the matching.

14. The non-transitory computer-readable medium of claim 13, wherein the matching the query part in the NLQ input to the metadata placeholder node in the path in the lookup tree of the template comprises traversing the path in the lookup tree, wherein the path comprises a plurality of query parts in the predetermined natural language query.

15. The non-transitory computer-readable medium of claim 13, wherein the matching the query part in the NLQ input to the metadata placeholder node in the path in the lookup tree of the template comprises identifying the query part in the NLQ input as a measure of the database, wherein the identifying is performed by traversing a list of measures in the template.

16. The non-transitory computer-readable medium of claim 13, wherein the matching the query part in the NLQ input to the metadata placeholder node in the path in the lookup tree of the template comprises identifying the query part in the NLQ input as a dimension of the database, wherein the identifying is performed by traversing a list of dimensions in the template.

17. The non-transitory computer-readable medium of claim 13, wherein the matching the query part in the NLQ input to the metadata placeholder node in the path in the lookup tree of the template comprises identifying the query part in the NLQ input as an aggregation of a measure of the database, wherein the identifying is performed by traversing a list of aggregations of measures in the template.

18. The non-transitory computer-readable medium of claim 13, wherein the matching the query part in the NLQ input to the metadata placeholder node in the path in the lookup tree of the template comprises identifying the query part in the NLQ input as a grouping of a dimension of the database, wherein the identifying is performed by traversing a list of groupings of dimensions in the template.

19. The method of claim 1, wherein the query part in the NLQ input occurs in a first position in the NLQ input and the query part in the predetermined natural language query occurs in a second position in the predetermined natural language query, wherein the first position is less than the second position.

20. The method of claim 1, further comprising:
   executing, by the computing device, the AQL query on the database based on the matching.

21. The method of claim 1, wherein the updating the query part in the NLQ input to be metadata in the metadata placeholder node corresponding to the predetermined natural language query comprises updating the query part in the NLQ input to be metadata in the metadata placeholder node based on the query part in the NLQ input being a measure or a filter criterion.

* * * * *